United States Patent [19]
Mowdood et al.

[11] 3,719,624
[45] March 6, 1973

[54] VINYL CHLORIDE POLYMERS HAVING IMPROVED THERMAL STABILITY AND METHOD OF MAKING

[75] Inventors: Syed K. Mowdood; Charles J. Gebhart, both of Akron, Ohio

[73] Assignee: The Goodyear Tire and Rubber Co., Akron, Ohio

[22] Filed: May 28, 1971

[21] Appl. No.: 148,204

[52] U.S. Cl..........260/23 XA, 260/17 R, 260/23 EM, 260/29.6 ME, 260/29.6 T, 260/29.8, 260/45.7 R, 260/45.75 R, 260/45.85, 260/45.95
[51] Int. Cl..............................................C08f 45/8
[58] Field of Search........260/45.7 R, 17 R, 45.75 R, 260/45.85, 23 XA, 23 EM, 29.8, 45.95, 29.6 ME, 29.6 T

[56] References Cited

UNITED STATES PATENTS

| | | | |
|---|---|---|---|
| 2,921,046 | 1/1960 | Arlman | 260/45.7 R |
| 3,054,771 | 9/1962 | Hiestand et al. | 260/23 XA |

*Primary Examiner*—William H. Short
*Assistant Examiner*—L. M. Phynes
*Attorney*—F. W. Brunner and V. G. Parker

[57] ABSTRACT

Vinyl chloride is polymerized in the presence of a bicyclo [3.1.1] hept-2-ene heat stabilization sensitizer (i.e., 6,6-dimethyl bicyclo [3.1.1] hept-2-ene-2-ethanol) also known as nopol to form a more ecologically acceptable polymer because the polymer can be thermally stabilized without the use of conventional tin and cadmium stabilizers.

3 Claims, No Drawings

VINYL CHLORIDE POLYMERS HAVING IMPROVED THERMAL STABILITY AND METHOD OF MAKING

It has been discovered that the polymers of this invention are more sensitive to the effects of conventional heat stabilizers when the polymer is made in the presence of nopol. The resulting polymer is effectively stabilized with relatively small amounts of conventional heat stabilizers other than cadmium and tin types as shown by film made therefrom having improved thermal stability, less tendency to block and good clarity.

The examples illustrate how the improved resin of the present invention is made, all parts being by weight unless otherwise indicated.

GENERAL AND PREFERRED CONDITIONS OF POLYMERIZATION

Formulation A

| Ingredients | Parts By Weight Range (G) General (P) Preferred |
|---|---|
| 1. Polymerizable Monomer | G 100 |
| a. vinyl chloride | G 51-100 |
| b. monomer copolymerizable with vinyl chloride | G 49-0 |
| 2. Liquid Reaction Medium (water) to suit | |
| a. water | G 50-1000 |
| | P 150-400 |
| b. water-to-monomer ratio | G .5:1 to 10:1 |
| | P 1.50:1 to 4:1 |
| 3. Heat Stabilization Sensitizer | G .05 to 1.0 |
| a. nopol | P .1 to .5 |
| 4. Suspending Agent | G .05 to 1.0 |
| i.e. protective colloid | P .10 to .20 |
| a. hydroxypropyl methylcellulose | P .10 to .20 |
| b. polyvinyl pyrrolidone | G MW 30,000-300,000 |
| | P MW 150,000-200,000 |
| c. polyvinyl alcohol | P .15 to .25 |
| 5. Free-Radical Initiator | G .05 to .50 |
| i.e. peroxy type | P .12 to .20 |
| a. t-butyl peroxypivalate (75% in mineral spirits) | P .10 to .20 |
| b. in-situ | |
| (1) ethyl chloroformate | G .01 to .5 |
| | P .09 |
| (2) 50% $H_2O_2$ | G .01 to .5 |
| | P .04 |
| (3) buffer (sodium bicarbonate) | G .01 to .5 |
| | P .16 |
| 6. Temperature of Polymerization (°F) | G 70°F. - 180°F. |
| | P 100°F. - 150°F. |
| Reaction time (hours) | G 3 - 25 hours |
| | P (to substantial completion) |
| 7. Conversion (%) | G 60-98% |
| | P (to substantial completion) |
| 8. Stirrer: One propeller stirring downward in conjunction with baffles | |
| RPM | G 400 to 500 |
| | P 450 |
| 9. Pressure on polymerization system (in reactor) psi | G at least equal to the vapor pressure of the reactants |

The free radical suspension polymerization of vinyl chloride in the presence of nopol (added either at the start or during the reaction) yielded polymer more favorably affected by conventional heat stabilizers than the control. The stabilized polymer possessed improved thermal stability and improved film clarity when formulated with a conventional zinc and calcium salt heat stabilizer. The following are typical examples of a polymerization recipe for making the improved polymer of this invention.

EXAMPLE 1

| | |
|---|---|
| Vinyl chloride | = 100.0 |
| Polyvinyl pyrrolidone (MW 150,000 - 300,000) | = 0.10 |
| Tertiary butyl peroxypivalate (75% in mineral spirits) | = 0.10 |
| Nopol | = 0.10 |
| Distilled water | = 200.0 |
| I.V. of polymer | = 0.708 |

EXAMPLE 2 (in-situ)

| | |
|---|---|
| Vinyl chloride | = 100.0 |
| Nopol | = 0.10 |
| Ethyl chloroformate | = 0.09 |
| 50% hydrogen peroxide | = 0.04 |
| Sodium bicarbonate | = 0.16 |
| Sodium salt of ethylene diamine tetraacetic acid | = 0.03 |
| Methocel 60Hg-50 (hydroxypropyl cellulose) | = 0.10 |
| Polyvinyl alcohol | = 0.03 |
| Distilled water | = 200.0 |
| I.V. of the polymer | = 0.725 |

EXAMPLE 3 (control)

| | |
|---|---|
| Vinyl chloride | = 100.0 |
| Polyvinyl pyrrolidone (MW 150,000 - 300,000) | = 0.10 |
| Tertiary butyl peroxypivalate (75% in mineral spirits) | = 0.10 |
| Distilled water | = 200.0 |
| I.V. of the polymer | = 0.745 |

Each of Examples 1 to 3 were polymerized at 150°F. until discharge time. The poly (vinyl chloride) prepared by the Examples above had the following properties when compounded as formulated below for molding bottles.

FORMULATION B

| | | | |
|---|---|---|---|
| Nopol PVC - Ex. 1 | 100 | — | — |
| Nopol PVC - Ex. 2 | — | 100 | — |
| Control PVC - Ex. 3 | — | — | 100 |
| Epoxol 9-5(1) | 3.0 | — | — |
| BTA III (8) | — | 13 | 13 |
| Acryloid K 147 (9) | — | 3 | 3 |
| R & H 55D-42 (2) | 3.0 | — | — |
| Synpron 1127 (10) | — | 1.75 | 1.75 |
| Nuostabe AE 949 (5) | 0.25 | 0.25 | 0.25 |
| R & H 6904XP (3) | 13 | — | — |
| Admex 711 (11) | — | 2 | 2 |
| Synpron 241 (6) | .75 | — | — |
| PA 190 (7) | 0.5 | 0.25 | 0.25 |
| Synpron A-26 (4) | 1.75 | — | — |
| Mill stability at 370°F (in mins) | 25.0 | 20.9 | 12.6 |
| Percent Haze | 2.9 | 3.9 | 5.6 |

Symbols

1. Epoxol 9-5: Epoxidized Linseed Oil
2. R & H 55D-42: Low molecular weight acrylic processing aid
3. R & H 6904XP: General purpose acrylic impact modifier
4. Synpron A-26: Modified calcium-stannous-zinc stabilizer
5. Nuostabe AE 949: Calcium-zinc complex stabilizer
6. Synpron 241: Phosphite chelator
7. PA 190: Low mol wt. polyethylene lubricant
8. BTA III: Methyl methacrylate/butadiene/styrene impact modifier
9. Acryloid K147: Low mol wt. acrylic processing aid
10. Synpron 1127: Phosphite chelator
11. Admex 711: Epoxidized soybean oil In general a bicyclo [3.1.1] hept-2-ene may be used as a heat stabilization sensitizer, nopol used above being the preferred species and having the general formula:

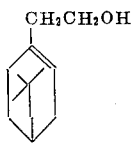

Any of the well known calcium salts and zinc salts may be used as stabilizers for the improved vinyl resin of this invention. Included are the aromatic and aliphatic acid salts such as zinc and calcium salts of various phenyl carboxylic acids such as ortho, meta and para-toluic acid, phenyl acetic acid, any of the several dimethyl benzoic acids, β-phenyl propionic acid, any of the amino benzoic acids, β-phenyl-α-amino propionic acid, β-phenyl-β-amino-propionic acid, o-amino-β-phenyl propionic acid, salicylic acid, m-hydroxy benzoic acid, p-hydroxy-benzoic acid, β-p-hydroxy phenyl propionic acid, polyhydroxy benzoic acids such as 3,4-di-hydroxy benzoic acid, vanillic acid, gallic acid, gallotannic acid, phenyl glycollic acid, o-hydroxy methyl benzoic acid, α-phenyl-β-hydroxy propionic acid, phenyl glyoxylic acid, benzoyl acetic acid, phthalic acid, isophthalic acid, 5-methyl isophthalic acid, terephthalic acid, 2,5-hydroxy terephthalic acid; also zinc and calcium salts of fatty acids including calcium and zinc stearate and oleate.

Although the present invention is disclosed in connection with the polymerization of vinyl chloride, the process of the present invention is applicable with regard to the polymerization of any ethylenically unsaturated monomer which may be reacted to produce high molecular weight polymers or synthetic rubber in a polymerization reaction employing the present invention. Included are those unsaturated organic compounds which contain the structure

and, in most cases, have at least one of the disconnected valences attached to an electronegative group, that is, a group which increases the polar character of the molecule, such as a chlorine atom or an organic group containing a double or triple bond such as vinyl, phenyl, nitrile, carboxy, or the like. Included in this class of monomers are the conjugated diolefins. Conjugated diolefins having from four to six carbon atoms, for example, 1,3-butadiene (butadiene); 2,3-dimethyl-1,3-butadiene; isoprene; piperylene; 3-furyl-1,3-butadiene; 3-methoxy-1,3-butadiene, and the like may be used. Other suitable materials are the haloprenes such as chloroprene (2-chloro-1,3-butadiene); bromoprene; methylchloroprene (2-chloro-3-methyl-1,3-butadiene) and the like; the aryl olefins such as styrene, the various alkyl styrenes; p-chloro-styrene; p-methoxystyrene; 2-methyl styrene; vinylnaphthalene and similar derivatives thereof and the like; acrylic and substituted acrylic acids and their esters; nitriles and amides such as acrylic acid, methacrylic acid, methyl acrylate, ethyl acrylate, methyl 2-chloroacrylate methyl methacrylate, ethyl methacrylate, butyl methacrylate, methyl ethacrylate, acrylonitrile, methacrylonitrile, methacrylamide and the like; methyl isopropenyl ketone, methyl vinyl ketone, methyl vinyl ether, vinylethinyl alkyl carbinols, vinyl acetate, vinylchloride, vinylidene chloride, vinylfurane, vinylcarbazole, vinylacetylene and other unsaturated hydrocarbons, esters, alcohols, acids, ethers, etc., of the types described. In general this invention is applicable to the emulsion as well as the suspension polymerization of these materials which polymerize either alone or with another copolymerizable material. These materials may be polymerized alone, in which case simple homopolymers are formed, or mixtures of two or more materials which are copolymerizable with each other may be polymerized to form copolymers.

Homopolymers of vinyl chloride, of vinylidene chloride, and of acrylonitrile are of particular significance, but polymers of vinyl chloride, of vinylidene chloride, and of acrylonitrile with other monomers copolymerizable with these primary monomers wherein at least 50 percent of vinyl chloride, vinylidene chloride or acrylonitrile is present during the polymerization are also included in this invention. If terpolymers are being made using, for example, two of the primary monomers, then the primary monomers are to be present in a total amount equal to at least 50 percent and the remaining or third monomer is to be present in an amount sufficient to make 100 percent based on total monomers used. An example of a terpolymer would be 35 percent methyl methacrylate.

Monomers polymerizable with the preferred monomers include the vinyl esters of carboxylic acids, including vinyl acetate, vinyl propionate, vinyl butyrate and vinyl benzoate. Other monomers that may be used in the same manner include the esters of unsaturated carboxylic acids, such as methyl acrylate, ethyl acrylate, butyl acrylate, ethyl maleate, propyl maleate, butyl maleate, and allyl acrylate.

Any free radical type initiator for the polymerization of ethylenically unsaturated monomer may be used and include catalysts that are soluble in the monomer such as benzoyl peroxide, isopropyl peroxydicarbonate, ethyl peroxydicarbonate, dicaproyl peroxide, acetyl benzoyl peroxide, diacetyl peroxide, paratertiary butyl perbenzoate, tertiary butyl perlaurate and ditertiary butyl peroxide. Catalysts that are soluble in the water phase may also be used including sodium perborate, potassium persulphate and hydrogen peroxide.

Any surface active agent may be used including emulsifiers and suspending agents such as gelatin, pectin, methyl cellulose, carboxymethyl cellulose, alginates, and soluble starch, gum acacia, gum tragon, agar-agar and tragacanth. Emulsifiers that may be used where the polymerization is carried out in an emulsion include the fatty acid soaps, the alkyl sulphates ($C_8$–$C_{18}$), alkyl sulfonates ($C_{12}$–$C_{16}$), sulfonated and sulphated mixed ethers, sulfonated and sulphated alkyl esters of fat acids and sulfonated alkyl substituted amides of fat acids. These agents may be used in amounts from 0.05 to 2 percent.

While certain representative embodiments and details have been shown for the purpose of illustrating the invention, it will be apparent to those skilled in this art that various changes and modifications may be made therein without departing from the spirit or scope of the invention.

What is claimed is:

1. A heat stable polyvinyl chloride resin of at least 50 percent of vinyl chloride units optionally with another ethylenically unsaturated compound made in the presence of nopol as a heat stabilizer.

2. A method of making a heat stable vinyl chloride resin comprising adding nopol as a heat stabilizer to the polymerization reaction containing vinyl chloride as a polymerizable monomer.

3. The resin of claim 1 compounded with a stabilizer selected from at least one of the group consisting of a zinc salt and a calcium salt of an acid selected from the group consisting of phenyl carboxylic acids, dimethyl benzoic acids, amino benzoic acids, polyhydroxy benzoic acids and fatty acids.

* * * * *